June 28, 1960 R. BINDER 2,942,593
AIR-COOLED INTERNAL COMBUSTION ENGINE ARRANGEMENT
Filed Aug. 5, 1958
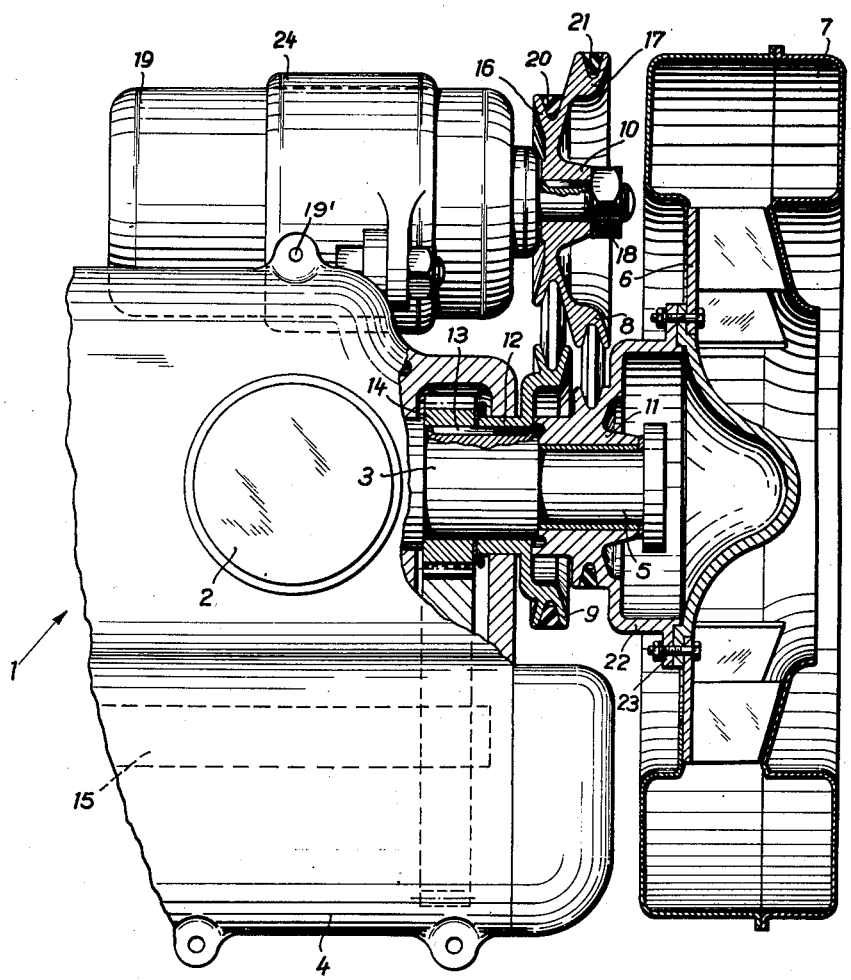
INVENTOR
ROBERT BINDER
BY Dicke and Craig
ATTORNEYS

United States Patent Office 2,942,593
Patented June 28, 1960

2,942,593

AIR-COOLED INTERNAL COMBUSTION ENGINE ARRANGEMENT

Robert Binder, Stuttgart-Zuffenhausen, Germany, assignor to Firma Dr.-Ing. h.c. F. Porsche K.-G., Stuttgart-Zuffenhausen, Germany Filed Aug. 5, 1958, Ser. No. 753,279

Claims priority, application Germany Aug. 24, 1957

6 Claims. (Cl. 123—41.65)

The present invention relates to an air-cooled internal combustion engine with a blower arranged at the crankshaft thereof, the blower being rotatably supported on or mounted on the crankshaft and being operatively connected therewith by means of a transmission.

It is known that a step-up transmission, i.e., a transmission providing a gearing-up ratio, should desirably be arranged between the crankshaft and the blower so as to increase the rotational speed of the blower with respect to that of the crankshaft. This, however, results not only in a larger cooling blower but also in a greater structural length of the internal combustion engine, especially if the drive for the auxiliary devices or aggregates are considered which are necessary for proper operation.

According to the present invention, the countershaft of the transmission for the blower serves also as drive shaft for an auxiliary aggregate of the internal combustion engine. As a result of such an arrangement, the blower dimensions become relatively small.

Furthermore, in addition to the compensation of the additional increase in the structural length of the internal combustion engine, a saving is obtained also with respect to driving elements and parts thereof actually used in the installation.

Furthermore, by the use of an arrangement in accordance with the present invention, it is made possible that for all practical purposes no further driving elements over and beyond the normal requirements become necessary whereby, simultaneously therewith, there is offered the advantage of a rapidly rotating blower which is arranged at the crankshaft and therewith is arranged in a space-saving manner.

For purposes of further reducing the cost of the drive arrangement, the present invention provides a transmission constructed as V-shaped belt drive of which the two V-shaped belts have the same length. In order to render the belt tension of the transmission adjustable, the auxiliary aggregate is pivotally arranged at a bracket of the internal combustion engine.

Accordingly, it is an object of the present invention to provide a transmission and drive arrangement of a cooling blower for an internal combustion engine from the crankshaft thereof which is simple in construction, space-saving in its physical layout and which minimizes the number of parts necessary therefor.

Another object of the present invention resides in the provision of a transmission for purposes of driving the blower of an air-cooled internal combustion engine from the crankshaft of the engine with a stepped-up transmission ratio in such a manner that the parts necessary for the drive are minimized.

Still another object of the present invention resides in the provision of an arrangement for driving the blower of an air-cooled internal combustion engine from the crankshaft by means of a single transmission, which serves simultaneously as drive for other additional auxiliary aggregates.

Still another object of the present invention resides in the provision of an adjustable transmission of the belt-driven type for purposes of driving the blower of an air-cooled internal combustion engine from the crankshaft in which the transmission is pivotally mounted on a bracket fastened to the engine so as to adjust the belt tension to any suitable tension.

These and other objects, features and advantages of the present invention will become more obvious from the following description when taken in connection with the accompanying drawing, which shows, for purposes of illustration only, in the single view thereof, one embodiment in accordance with the present invention, and wherein the single figure shows the side view of a drive arrangement for the blower of an air-cooled internal combustion engine in accordance with the present invention with certain parts thereof broken away for clarity's sake.

Referring now to the drawing, reference numeral 1 generally designates therein the internal combustion engine which is constructed as an opposed cylinder-type engine provided with horizontally disposed cylinders 2 and with a crankshaft 3 which are supported in an engine casing 4 by means of appropriate bearings. A blower wheel 6 of a cooling air blower 7 is mounted over the end 5 of the crankshaft 3 which extends beyond the housing 4. The drive for the blower wheel 6 takes place indirectly from the crankshaft 3 over a V-shaped belt transmission 8 which consists of a belt pulley 9 secured to the crankshaft 3, of a double-belt pulley 10 and of a belt pulley 11 rotatably mounted on the crankshaft 3 and connected with the blower wheel 6 in any suitable manner for common rotation therewith.

For purposes of securing the belt pulley 9 at the crankshaft 3, the pulley 9 is provided with a hub portion 12 which is connected with the crankshaft 3 by means of a spline or key member 13 for purposes of assuring common rotation therewith. For purposes of simplification, the spline or key member 13 is constructed of such length that it simultaneously serves for taking along the adjacent gear wheel 14 for the drive of the camshaft 15.

The double pulley 10 consisting of two belt pulleys 16 and 17 is supported on the shaft 18 of a dynamo or generator 19 which is driven thereby. The pulley 16 is operatively connected with the pulley 9 by means of a V-shaped belt 20 while the pulley 17 is operatively connected with the pulley 11 by means of a V-shaped belt 21 whereby the pulley 11 is operatively connected with the blower wheel 6 in any suitable manner.

For that purpose, the belt pulley 11 is provided with a bell-shaped attaching portion 22 having an annularly shaped flange 23 to which the blower wheel 6 is secured in any suitable manner.

The belt pulleys 9 and 17 as well as the belt pulleys 16 and 11 have the same diameter so that the V-shaped belts 20 and 21 have the same length and are interchangeable with one another. As a result of this construction, the number of spare parts which have to be kept in reserve is considerably simplified since the belts which have to be available only have one size.

The dynamo 19 is secured in a bracket 24 which in turn is pivotal about pivot pins 19' at the crank case housing 4. By the use of such pivotal securing of the dynamo 19, there exists the possibility to readily change the tension of the belts 20 and 21 by merely pivoting the dynamo 19.

While I have shown and described one embodiment in accordance with the present invention, it is understood that the present invention is not limited thereto but is susceptible of many changes and modifications within the scope and spirit of the present invention, and I, therefore, intend to cover all such changes and modifications as encompassed by the scope of the appended claims.

I claim:

1. In an air-cooled internal combustion engine adapted to drive an engine auxiliary device having a drive shaft, the combination comprising a crankshaft, blower means rotatably supported on said crankshaft, and change-speed transmission means operatively connecting said crankshaft with said blower means to drive said blower means at a higher speed than said crankshaft and to simultaneously drive said drive shaft.

2. In an air-cooled internal combustion engine, the combination according to claim 1, wherein said transmission means is constructed as a V-shaped belt transmission and includes V-shaped belts of equal length.

3. In an air-cooled internal combustion engine, the combination according to claim 2, further comprising bracket means and means including said bracket means for pivotally securing said engine auxiliary device at said internal combustion engine to thereby adjust the belt tension of said V-shaped belts.

4. In an air-cooled internal combustion engine, the combination according to claim 1, wherein said transmission means includes a pulley operatively connected for common rotation with said crankshaft, a pulley operatively connected with said blower means for common rotation therewith and rotatable on said crankshaft, a double-belt pulley on said drive shaft and belt means operatively connecting said first-mentioned pulley with one of the pulleys of said double-belt pulley and for operatively connecting the other of said double-belt pulley with said second-mentioned pulley.

5. In an air-cooled internal combustion engine, the combination according to claim 4, wherein said first-mentioned pulley and said other pulley as well as said one pulley of said double-belt pulley and said second-mentioned pulley have the same diametric dimensions so that the length of the two belts is the same.

6. In an air-cooled internal combustion engine, the combination according to claim 5, further comprising means adjustably connecting said auxiliary device to said engine to adjust the belt tension of said transmission means.

No references cited.